United States Patent [19]

Shustov

[11] Patent Number: 5,056,280

[45] Date of Patent: Oct. 15, 1991

[54] MULTI-STEP BASE ISOLATOR

[76] Inventor: Valentin N. Shustov, 536 3/4 N. Genesee Ave., Los Angeles, Calif. 90036

[21] Appl. No.: 588,976

[22] Filed: Sep. 12, 1990

[51] Int. Cl.$^5$ .................. E02D 27/34; E04B 1/98; E04H 9/02

[52] U.S. Cl. ................. 52/167 R; 52/167 CB; 248/638

[58] Field of Search ....... 52/167 R, 167 CB, 167 DF; 248/638

[56] References Cited

U.S. PATENT DOCUMENTS

| 951,028 | 3/1910 | Schär | 52/167 R |
|---|---|---|---|
| 2,014,643 | 9/1935 | Bakker | 52/167 R X |
| 2,359,036 | 9/1944 | Harper | 52/167 R X |
| 3,771,270 | 11/1973 | Byers | 52/167 R |
| 4,462,955 | 7/1984 | Albin et al. | 52/167 R X |
| 4,514,941 | 5/1985 | Gonzalez Flores | 52/167 R |
| 4,883,250 | 11/1989 | Yano et al. | 52/167 R X |
| 4,974,378 | 12/1990 | Shustov | 52/167 R |

FOREIGN PATENT DOCUMENTS

| 2500873 | 9/1982 | France | 52/167 |
| 1229252 | 5/1986 | U.S.S.R. | 52/167 |
| 1283296 | 1/1987 | U.S.S.R. | 52/167 |
| 496592 | 12/1938 | United Kingdom | 52/167 |

*Primary Examiner*—David A. Scherbel
*Assistant Examiner*—Deborah McGann Ripley

[57] ABSTRACT

A manufacture to protect a structure from destructive earthquakes as well as to secure its stability under the strongest possible wind, having a number of ball transfer units rigidly coupled to a supported superstructure; the same number of pedestal plates supporting the ball transfer units, each having an upper surface having a plurality of curved surfaces with a central depression following the shape of the ball. The force of gravity will keep the structure in its steady initial position when the balls are inset into corresponding depressions at any wind pressure and at slight earthquakes. With magnitude of earth movement exceeding a certain threshold the balls get out of central depressions thus providing a controlled separation of the superstructure from the foundation, and the upper surfaces of pedestal plates with properly designed geometry governs transfer of horizontal movement into the superstructure and prevents hazardous structural vibrations.

1 Claim, 2 Drawing Sheets

MULTI-STEP BASE ISOLATOR

BACKGROUND OF THE INVENTION

1. Field of the Invention

The present invention relates to earthquake base isolation of buildings and other structures. More particularly, the invention relates to multi-step base isolators.

2. Discription of the Prior Art

The invention entitled "Earthquake Shelter" U.S. Pat. No. 4,965,895 incorporates a ball bearing base isolator where the ball bearing is supported on a pedestal plate having a concave upper surface; the ball bearing permits the superstructure to sustain a very small horizontal deformation during a severe earthquake as well as to return to its original position. But this system is not intended for resistance against wind.

In the invention entitled "Seismic Isolator" U.S. Pat. No. 4,974,378 another step is done: to prevent permanent horizontal post-earthquake offsets and at the same time to keep the system's ability to withstand wind pressure as well as minor earthquakes. A pedestal plate is provided with a depression which is shaped in compliance with the configuration of the contacting surface of the ball. In spite of substantial merits of this type of base isolation, called AFBI—Antifriction Base Isolation, under special circumstances, when the isolated structure sustains a resonant excitation with considerable amplitudes of earth displacement, the base shear can exceed windload threshold.

SUMMARY OF THE INVENTION

To minimize the transmission of earthquake energy into a superstructure and to confine the base shear in the substructure by an acceptable level, a base isolator is offered which includes of a ball transfer unit. The ball rests on a depression which is shaped in compliance with the configuration of the contacting surface of the ball and is centered at the lowest point of the pedestal plate having a plurality of concave surface and resting on a foundation. The upper surface of the pedestal plate consists of several concentric spherical surfaces of increasing radii of curvature and transforming into each other. Maximum vertical grade of every surface component is the same and is approximately equal to the ratio of the design wind load to the weight of the structure.

BRIEF DESCRIPTION OF THE DRAWINGS

In the description of the invention herein presented, references are made to the accompanying drawings, in which.

DESCRIPTION OF THE PREFERRED EMBODIMENT

Figure 1:
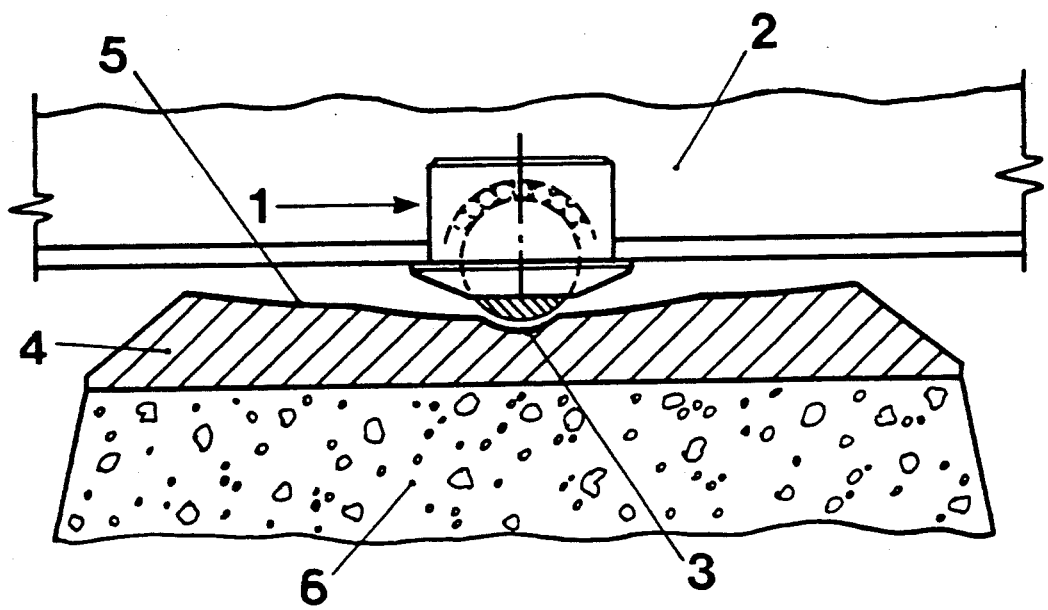
FIG. 1 is a schematic perspective of a multi-step base isolator with associated superstructure and foundation.

The present invention will be described with reference to the accompanying drawings. As illustrated at FIG. 1 the multi-step base isolator according to the invention has a ball transfer unit (1) which consists of a large ball that supports the superstructure (2) and permits the foundation to move horizontally not involving the superstructure in this movement. The large ball is positioned in a massive steel housing which is located above the ball and is coupled to the superstructure in order to ensure irreversible foot reactions and to prevent the induction of secondary waves of flexure in bearing elements of the superstructure. The large ball is separated from the housing by a plurality of smaller balls running in a hemispheric shell. The large ball rests on a depression (3) of a pedestal plate (4). The depression is shaped in compliance with the configuration of the contacting surface of the ball and is centered at the lowest point of the upper surface (5) of the pedestal plate resting on a foundation (6) to which it is firmly attached. In order to prevent excessive travel of the superstructure, as well as overloading of a substructure in a low frequency range of earthquake spectra, where periresonant conditions for a base isolated structure can exist, the upper surface of the pedesal plate is shaped with a plurality of concentric spherical surfaces (5) with successively increasing radii of curvature, R, which are continuously transforming into each other.

Figure 2:
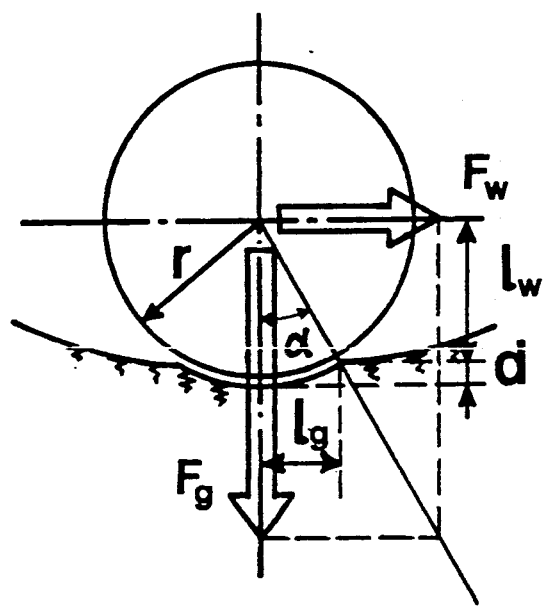
FIG. 2 is an enlarged vertical elevation of the ball, depression and adjoining part of the pedestal plate with a pattern of acting forces.

The depth of the depression, d, at a given radius, r, of the ball is governed mainly by weight of the structure, Fg, and by design wind load, $F_w$ (FIG. 2). For most structures, the maximum wind load averages are relatively small fraction of a strong earthquake base shear; therefore the force of gravity will keep the structure in a steady position on the pedestal plate, both at any wind and at slight earthquakes. When a magnitude of the earth movement exceeds a specified threshold, the ball gets out of the depression, any transfer of horizontal movement to the superstructure sharply decreases until the base isolated structure is resonantly excited which gives rise to excessive travel of the superstructure. Though this travel cannot result in damaging deformations of the superstructure, it is undesirable for equipment and yields overloading of the substructure.

Figure 3:
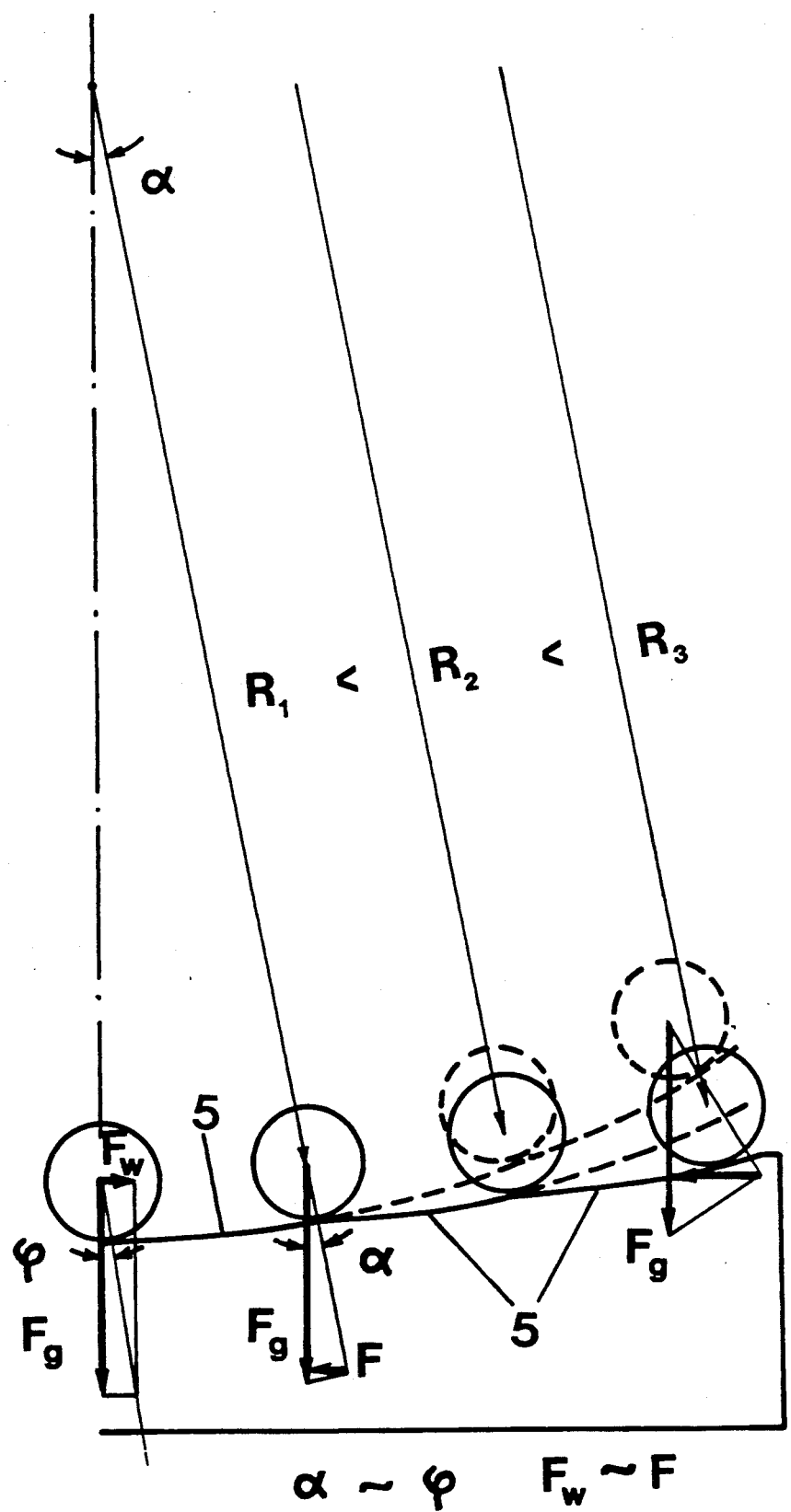
FIG. 3 is a fragment of a cross-section of a multi-step base isolator which represents a multi-curved upper surface of the pedestal plate with the ball in the critical positions and a pattern of acting forces where F is the maximum of the horizontal component of the force resisting to a relative movement of the ball against the foundation which is equal to the maximum base shear in the substructure.

To ensure that the base shear in the substructure does not exceed a specified horizontal wind pressure in any possible range of seismic ground motion, the maximum vertical grade of all spherical surfaces is confined by the ratio of the design wind load to the weight of the superstructure (FIG. 3). Successively increasing radii of curvature of adjacent spherical surfaces provide a condition for multi-step tuning-out this forcibly vibrating system and thus preventing the structure from resonant amplification.

The diameter of the cavity in the pedestal plate is not less than a double maximum amplitude of displacement during a strong earthquake. The radius of vertical curvature of the central sphere of the upper surface of the pedestal is designed as big as possible to provide a proper tuning-out of the natural frequencies of the base-isolated from the fixed-base structure.

What is claimed:

1. A system of seismic base isolation devices adapted to separate a superstructure from a foundation for protection against damaging effect of strong earthquakes and at the same time to prevent a separation under wind loads or minor earthquakes, each of said devices comprising:

a ball transfer unit consisting of a large ball positioned in a massive steel housing, said housing located above said ball and connected rigidly to a supported superstructure, said ball separated from said housing by a plurality of smaller balls running in a hemispheric shell;

a pedestal plate attached to a foundation and supporting said ball transfer unit being in rollable contact with an upper surface of said pedestal plate during a horizontal vibration of said foundation, said upper surface being a plurality of concentric spherical surfaces with a common vertical axis of symmetry and with successively increasing radii of curvature, the maximum vertical grade of said spherical surfaces being a function of the ratio of the design wind load to the weight of the superstructure, the geometry of said upper surface of said pedestal plate being governed by correlation of natural periods of vibration of isolated and fixed-base structures, as well as by characteristics of the anticipated earthquake;

a depression in the center of said pedestal plate forming a contacting surface following the shape of said ball, the geometry of said depression at given radius of said ball being governed by interrelation between design wind load and weight of the superstructure in supposition that said ball remains in said depression retaining integrity of the superstructure with the foundation under wind pressure or minor earthquakes but may roll out of said depression, permitting relative movement of the foundation with respect to the superstructure during earthquakes of moderate to strong magnitude.

* * * * *